March 21, 1950   C. J. ROHLAND   2,501,582
FILTER
Filed May 12, 1945   2 Sheets-Sheet 1
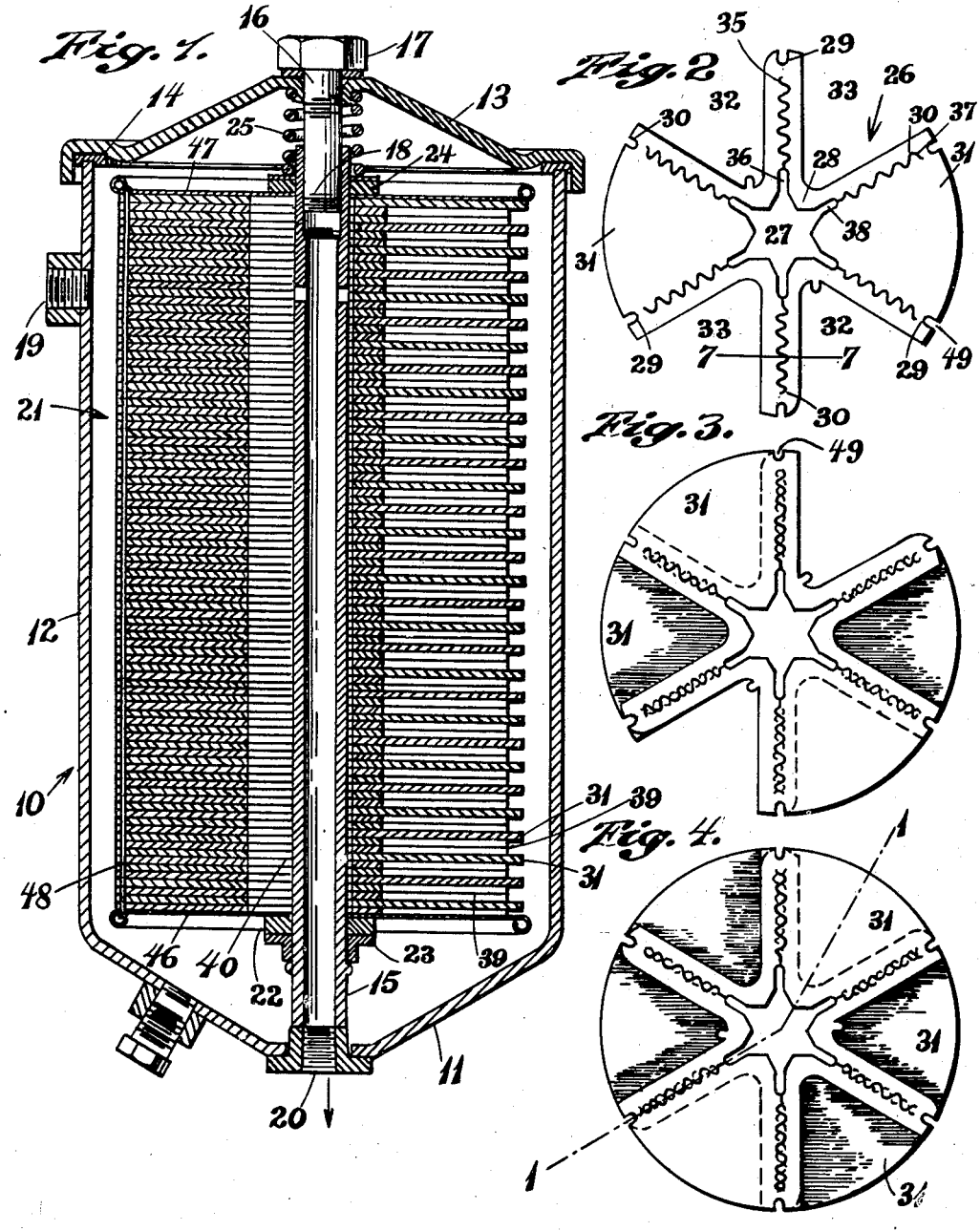
INVENTOR.
Curt J. Rohland
BY
Barlow & Barlow

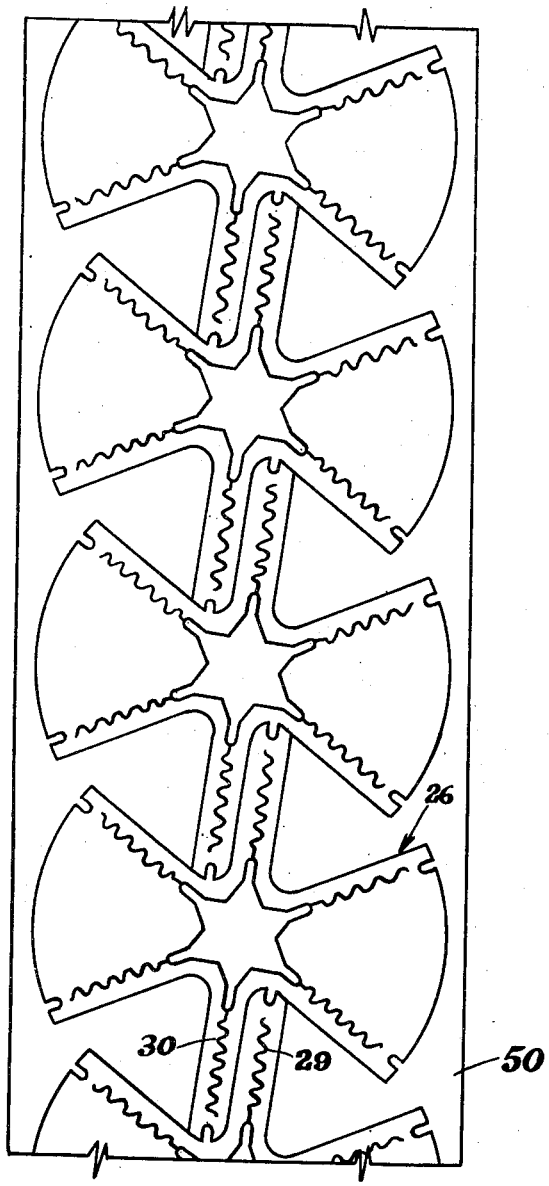
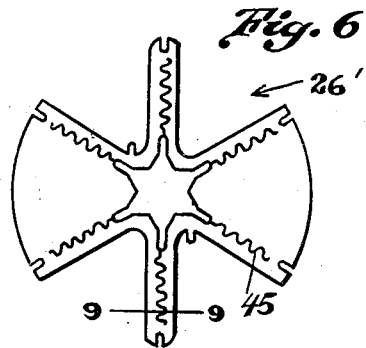
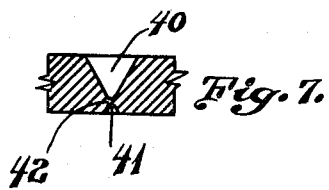
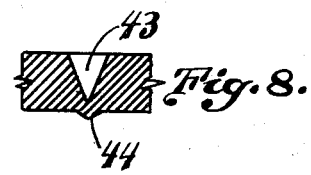
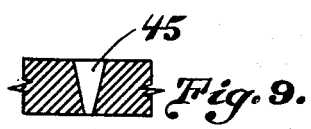

Patented Mar. 21, 1950

2,501,582

UNITED STATES PATENT OFFICE 2,501,582

FILTER

Curt J. Rohland, Seekonk, Mass., assignor to Fram Corporation, a corporation of Rhode Island Application May 12, 1945, Serial No. 593,354

8 Claims. (Cl. 210—169)

This invention relates to a filter element for removing contaminant from a liquid, and more particularly to a removable cartridge which may be inserted in a casing and removed therefrom after contaminant has been collected in the cartridge.

In the use of cell type filters, such as that made from paper or of some porous stock of the type generally shown in the patent to Malanowski #2,269,725, dated January 13, 1942, it is necessary to provide members of two different shapes, assembling one shape between the other shape, in order that the cells of the filter may be provided.

One of the objects of this invention is to provide a filter element formed from identical members and yet provide the cell type construction of element as above referred to.

Another object of this invention is to so shape the identical members that cells may be formed by different orientation of the members about a common axis.

Another object of the invention is to provide a shaping of the members so that a saving of material may be provided in cutting the members from web stock.

Another object of the invention is the shaping of the members so that they may be cut in an intermeshing relation, one with the other, so that portions of one may extend into recesses between portions of the other in the ribbon web from which they are cut.

Another object of the invention is to provide a long length of conduits connected to the low pressure side of the filter for the passage of filtrate from the filter element.

Another object of this invention is to provide a short passage for the filtrate such as by the formation of oil channels in spokes which radiate from the central axis and provide a minimum flow distance to the filtrate channels.

Another object of the invention is to provide oil channels which may connect with the central opening, without the removal of stock of the members.

A further object of the invention is to provide a member of sufficient strength to avoid rupture in handling.

With these and other objects in view, the invention consists of certain novel features of construction, as will be more fully described and particularly pointed out in the appended claims.

With reference to the drawings:

Fig. 1 is a sectional view showing a filter case with a filter element of the construction of this invention positioned therein, said element being sectioned on line 1—1 of Fig. 4.

Fig. 2 is a top plan view of one of the members which forms a stack of identical members in the filter element.

Fig. 3 is a top plan view of two of the members, such as shown in Fig. 2, superimposed one on the other with one oriented about the central axis.

Fig. 4 is a top plan view, showing three of the members such as shown in Fig. 2 in their proper relative positions, each oriented with respect to the other about the central axis.

Fig. 5 is a top plan view of a strip of stock shown with the members such as shown in Fig. 2 intermeshing for the utilization of a greater amount of the sheet strip than were the members each cut with each diameter extending edge to edge along the length of the strip.

Fig. 6 is a plan view of a member similar to Fig. 2 but of a modified form.

Fig. 7 is a section in line 7—7 of Fig. 2.

Fig. 8 is a section similar to Fig. 7 but of modified construction.

Fig. 9 is a section on line 9—9 of Fig. 6.

In proceeding with this invention, I cut a plurality of identical members from web stock of a predetermined thickness, usually in roll form, each of the members having an opening, which openings are all in registry when the members are stacked one on top of the other, providing the central axis of the filter element. A portion of the web stock extends about the axial opening and then additional portions radiate from this closing portion to provide spokes which divide the member into equal angular segments. Between at least two of the spokes the stock extends radially outwardly to provide a sector, while between at least two of the spokes, and which may be the same two spokes but over a different angular position, a space is provided. In assembling the members, I orient one member relative to the next member or an adjacent member about the central axis, so that the sector between two spokes of one member is positioned over a space between spokes of an adjacent member. A still further orientation of the next or an adjacent member is provided, that a further uncovered space may be covered by the sector of the next member. An orientation occurs in an amount equal to the angular distance between spokes until all spaces are covered and then a repetition of this arrangement occurs. Thus, there is provided a plurality of cells, each bounded by two sector portions of a member, and one or more spokes of the intervening members. The arrangement is such that mechanical handling may be had for assembly. Any number of spokes, which are equally distanced from one another, may be provided, and the orientation of adjacent members will be successively had in the amounts of the angular distances.

Filtering takes place through the paper of the members and between the members from a cell to the central axial opening and conduits radiating from the central opening are provided in each of the spokes of each member. The flow through or between the paper members takes place slowly and the conduits in the spokes may be of relatively small cross section and yet transmit the entire oil flow without any increase of pressure beyond that existing in the return passage of these conduits. Because of this very long conduit it may be extremely small in cross section and thus there may be provided a minimum width spoke and a maximum contaminant collecting cell.

With reference more specifically to the drawings, 10 designates a filter casing or shell having a bottom 11, and cylindrical side wall 12. A removable cover 13 is provided at the upper edge of the cylindrical wall 12 and is held in sealed relation to the shell by means of a resilient gasket 14. A center tube 15 extends upwardly from the bottom wall 11 and the cover 13 is held on to the cylindrical shell by means of a bolt 16 with a head 17 engaging the cover and having threaded engagement as at 18 with the center tube 15. An inlet opening is provided at 19 while a center tube provides for a discharge as at 20.

The filter element, which is more particularly the subject of this invention, is designated generally 21 and consists of a stack of identical members superimposed one upon the other and held in assembled relation to provide a removable unit which may be positioned within the casing 10 so that the same will rest upon a sealing gasket 22 engaging an abutment 23 and is sealed at its upper end by sealing gasket 24 engaging the upper end of the unit, the same being pressed downwardly by spring 25 which encircles the bolt 16.

The unit 21 is composed of identical members 26 shown in plan view in Fig. 2. Each of these is formed of paper, cardboard, or some filtrate transmittable material. The members each have a central opening 27, preferably of out of round shape so that an out of round spindle may be inserted for assembling the same in desired relative relation. This opening is surrounded by a closure portion 28 with a plurality of spokes 29 and 30 radiating from this closure portion 28. In the form which I have shown in Fig. 2 there are six of these spokes, arranged at equal angular distances around the closure portion 28, thus, in the complete circle the spokes are arranged 60° apart on their center lines. It is apparent however that other multiples may occur, for instance, there may be from two spokes up to an infinite number. The spokes will be equally spaced about the circumference of the circle. In the example shown, the sheet paper stock extends between two opposite pairs of these spokes to provide sectors or webs 31, 31 while between two spokes in another location, spaces 32 and 33 are provided. In the particular construction here illustrated, I have provided two sectors or webs 31 in diametrically opposite locations, while two sets of spaces 32—32 and 33—33 are provided between spokes in diametrically opposite locations. Where the webs exist between the spokes, no line of demarcation between web and spoke occurs, as the same sheet of stock continues uninterruptedly from spoke to web.

Filter conduits are provided in each of the spokes 29 and 30. These conduits may take various forms, so long as the resultant effect is such as to provide a channel sufficient to conduct all of the filtrate to the center opening 27 which passes to these conduits. One form of such conduit is shown as a zig-zag undulating wavy groove 35 in spoke 29 which extends from a point outwardly of the spoke inwardly to a slot 36 which connects with the center opening 27 of the member. In the adjacent spoke 30 a similar undulating or wavy groove 37 is provided, extending from the slot 38 which connects with the center opening 27 of the member radially outwardly of the spoke. The grooves 35 and 37 are opposite in form, that is, the crest of the wavy formation of the groove 35 would be opposite to the depressions of the wavy formation of the groove 37, so that the grooves in superimposed spokes 29 and 30 will cross as shown in Figures 3 and 4.

The groove 35 or 37 is usually formed by a knife which is somewhat V-shaped at its edge. This knife is brought down on to the member to be grooved and this member is backed up by some surface which may be more or less resilient. It is found that the cross section of the groove which is formed will vary, depending upon the character of the material or work which is impressed. For instance, if a very soft blotting like paper is worked upon, the resulting action of the knife edge will be somewhat as shown in Figure 7, that is, there will be a large, generally V-shaped, groove 40 provided on one side of the member and a shallow groove 41 opposite the groove 40 provided in the other surface of the member, leaving a very thin fibrous structure between the two, designated 42.

In other instances, where a cardboard or stiffer type of web is used, the groove formed by the same knife edge will be as illustrated in Figure 8, where there will be a V-shaped groove 43 in one side of the member and a projection 44 on the opposite surface of the member. In both the case shown in Figure 7 and the case shown in Figure 8, the stock adjacent the groove surface will be somewhat more compressed than the remainder of the member acted upon.

In some cases the knife edge may cut completely through the member 26', Fig. 6, as shown at 45 in Figure 9, and in this case also the stock will be compressed along the conduit surface which is formed.

In some cases members which are grooved as shown in Figure 7 or 8 after use will have the stock, such as 42, cleared away so that instead of a groove being formed from one surface, a slot such as 45 extends through the member. These variations depend largely upon the character of stock used and the firmness with which the fibers of the web are matted together, an essential feature being that some conduit be formed which is of a size sufficient to conduct all the filtrate to the center opening 27 where no pressure exists. In none of these cases of forming a conduit is there present the problem of removing stock to form a slot, which is somewhat more difficult of performance.

In assembly, one member 26 is superimposed upon another member 26, so that the openings 27 will be in registry and extend axially of the structure, each superimposed member will be oriented the angular distance between the center of the spokes or in the illustration here presented through 60° so that its web portions 31, 31 will be placed over the spaces 32, 32 between spokes of the adjacent disc. The third member will be superimposed upon these two previous members by it being oriented 60° relative to the previous member so that its webs 31, 31 will be located over the spaces 33, 33 in the first of the three members of the series. This same orientation through 60° of each succeeding disc will occur until the stack of members is built up to the required axial dimension. In this way a cell 39 will be formed between two web portions 31 and between the spokes of the two intermediate discs or members. A central opening 40 is provided in the stack, which will receive the center tube 15. The groove slots 35 and 37 will zig-zag across each other throughout the length of the spokes and any projection such as 44, Fig. 8, will not obstruct the groove beneath it.

The stack of members is provided with a metal bottom plate 46 and a metal top plate 47, which are held in assembled relation with the members by wires 48 located in notches 49 or other means, extending from one to the other at different locations.

In Figure 5 the members 26 are shown in overlapping relation by the spokes 29 of one member and 30 of another member extending one along the other in the web 50 from which they are cut.

I claim:

1. A cell type filter element comprising a stack of sheet members of identical configuration in the same axial direction of the stack, each member having an opening for registering with a like opening in the next member, and each member having uninterrupted webs of filtrate transmittable material with spaces between said webs, the webs of one member being differently oriented about the axis of said opening from that of adjacent members whereby the spaces between the webs provide cells partially bounded by the webs.

2. A cell type filter element comprising a stack of sheet members of identical configuration in the same axial direction of the stack, each member having an opening for registering with a like opening in the next member, and each member having uninterrupted webs of filtrate transmittable material radiating from said opening, with spaces between said webs, the webs of one member being differently oriented about the axis of said opening from that of adjacent members, whereby the spaces between the webs provide cells partially bounded by the webs.

3. A cell type filter element comprising a stack of sheet members of identical configuration in the same axial direction of the stack, each member having an opening for registering with a like opening in the next member, each member having a portion forming a closure about said opening with spokes radiating from said portion, a radiating uninterrupted web of filtrate transmittable material located between at least two of said spokes and a space between at least two of said spokes, adjacent members being oriented about the center of said opening substantially the angular distance between said spokes so that cells are formed by spaces located between said webs and are bounded by the spokes and the webs.

4. A cell type filter element comprising a stack of filtrate transmittable sheet members of identical configuration in the same axial direction of the stack, each member having an opening for registering with a like opening in the next member, each member having a portion forming a closure about said opening with spokes radiating from said portion, a radiating web located between at least two of said spokes and a space between at least two of said spokes, adjacent members being oriented about the center of said opening substantially the angular distance between said spokes so that cells are formed by spaces located between said webs and are bounded by the spokes and the webs, and conduits in said spokes extending to the said center opening and terminating short of the outer ends of the spoke.

5. A cell type filter element comprising a stack of filtrate transmittable sheet members of identical configuration in the same axial direction of the stack, each member having an opening for registering with a like opening in the next member, each member having uninterrupted webs radiating from said opening over a portion of the arc of a circle, the webs of successive members being oriented through substantially the angle of said arc of a circle covered by said web until the circle is completed by said webs.

6. A cell type filter element comprising a stack of filtrate permeable sheet members of identical configuration in the same axial direction of the stack, each member having an opening for registering with a like opening in the next member to provide a discharge conduit, and each member having uninterrupted webs radiating from said opening, with spaces between said webs, the webs of one member being differently oriented about the axis of said opening from that of adjacent members, whereby the spaces between the webs provide cells partially bounded by the webs.

7. A cell type filter element comprising a stack of filtrate permeable sheet members of identical configuration in the same axial direction of the stack, each member having an opening for registering with a like opening in the next member to provide a discharge conduit, each member having a portion forming a closure about said opening with spokes radiating from said portion, a radiating web located between at least two of said spokes and a space between at least two of said spokes, adjacent members being oriented about the center of said opening substantially the angular distance between said spokes so that cells are formed by spaces located between said webs and are bounded by the spokes and the webs, and are open at the outside of the cartridge and conduits in said spokes extending to the said center opening and terminating short of the outer ends of the spokes.

8. A cell type filter element comprising a stack of filtrate transmittable sheet members of identical configuration in the same axial direction of the stack, each member having an opening for registering with a like opening in the next member to provide a discharge conduit, each member having a portion forming a closure about said opening with spokes radiating from said portion, a radiating web located between at least two of said spokes and a space between at least two of said spokes, adjacent members being oriented about the center of said opening substantially the angular distance between said spokes so that cells are formed by spaces located between said webs and are bounded by the spokes and the webs, and are open at the outside of the cartridge.

CURT J. ROHLAND.

REFERENCES CITED

The following references are of record in the file of this patent:

UNITED STATES PATENTS

| Number | Name | Date |
|---|---|---|
| 1,694,939 | Heftler | Dec. 11, 1928 |
| 2,204,592 | Heftler | June 18, 1940 |
| 2,269,725 | Malanowski | Jan. 13, 1942 |
| 2,283,629 | Heftler | May 19, 1942 |
| 2,359,475 | Gauthier | Oct. 3, 1944 |